April 26, 1966   A. HOCK, SR   3,248,091
COOKER-MIXER
Filed Jan. 25, 1962   3 Sheets-Sheet 1

INVENTOR.
ALVIN HOCK, SR.
BY
Joseph A. Pave
Attorney

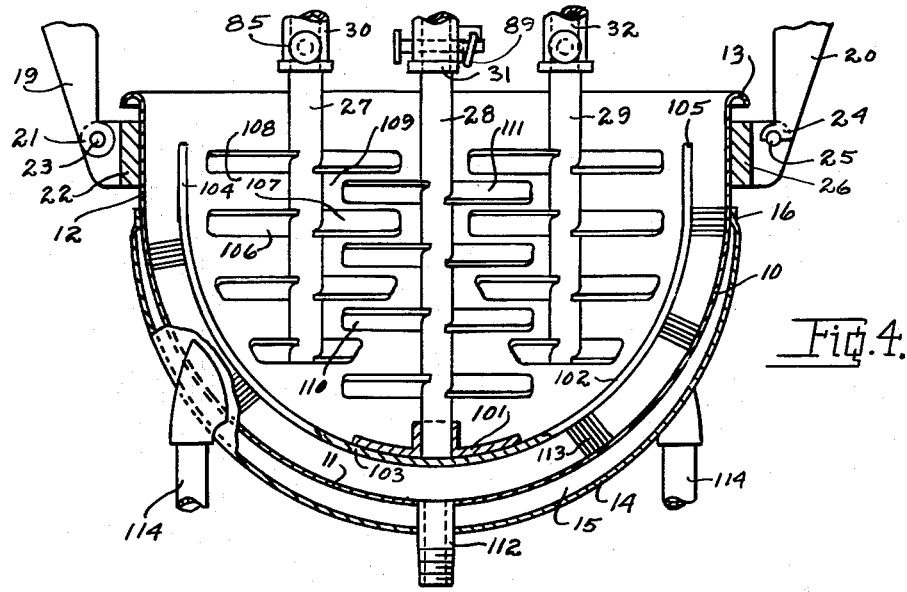
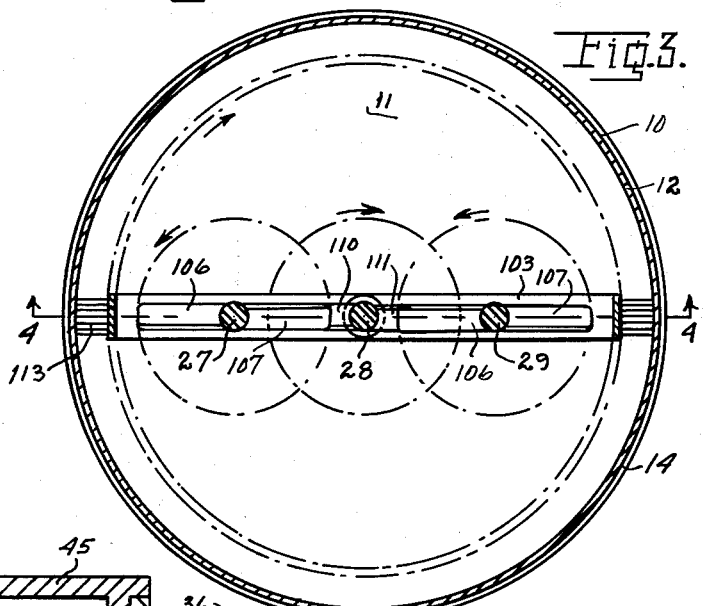
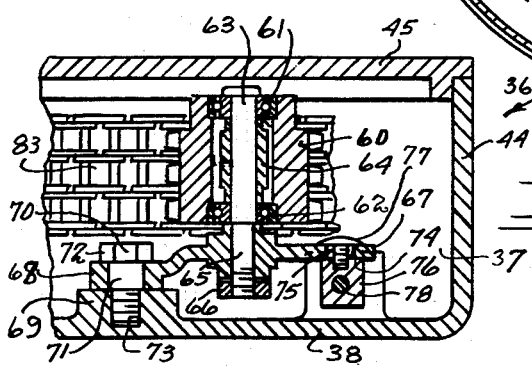
INVENTOR.
ALVIN HOCK, SR.
BY
Joseph A. Plave
Attorney

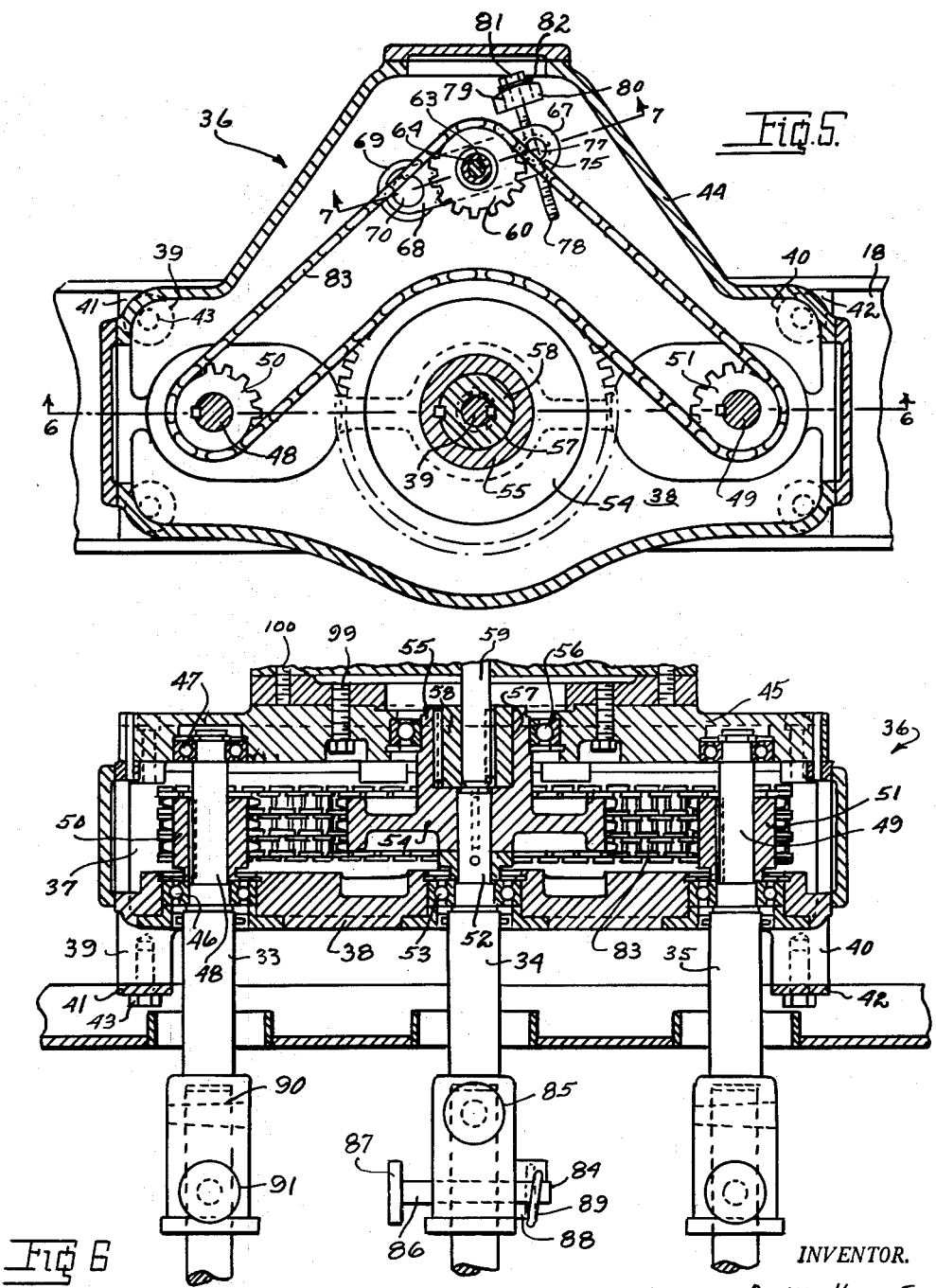

United States Patent Office 3,248,091
Patented Apr. 26, 1966

3,248,091
COOKER-MIXER
Alvin Hock, Sr., Cincinnati, Ohio, assignor to Brighton Corporation, Cincinnati, Ohio, a corporation of Ohio
Filed Jan. 25, 1962, Ser. No. 168,739
7 Claims. (Cl. 259—104)

This invention relates to improvements in a cooker-mixer, that is, this invention relates to improvements in a cooker or mixer employing what is generally known as a "steam jacketed kettle."

Steam jacketed kettles, per se, are not new in this application but cookers and mixers as heretofore produced and used were relatively inefficient when considered in connection with the time necessary to effect a thorough cooking and mixing of the ingredients in the kettle.

The principal object of the present invention, is, therefore, the provision of a mixer-cooker employing a steam jacketed kettle that effects a more thorough mixing during the cooking cycle and is therefore more efficient than mechanisms heretofore known and used.

Another object of this invention is the provision of a mixer-cooker in which the ingredients or contents of the mix in the kettle are continuously intermixed instead of being permitted to ride relatively freely between periodical mixing.

It is also an object of this invention to provide a cooker-mixer employing a kettle with mixing devices that can be economically produced whereby a more efficient cooker-mixer can be acquired at a cost considerably less than the less efficient device when the greater output of the cooker-mixer of the present invention is considered.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 3 is an enlarged, horizontal, sectional view through the kettle and parts intimately associated therewith, as seen from line 3—3 on FIG. 1.

FIG. 4 is a vertical, sectional view through the kettle and associated parts of FIG. 3, as seen from line 4—4 on said FIG. 3.

FIG. 5 is an enlarged, horizontal, sectional view through the driving mechanism, as seen from line 5—5 on FIG. 1.

FIG. 6 is a vertical, sectional view through the driving mechanism as seen from line 6—6 on FIG. 5.

FIG. 7 is an enlarged, sectional view through a portion of the driving mechanism as seen from line 7—7 on FIG. 5 and illustrating a detail in the invention.

Throughout the several views of the drawings similar reference characters are employed to denote the same or similar parts.

Figure 2:
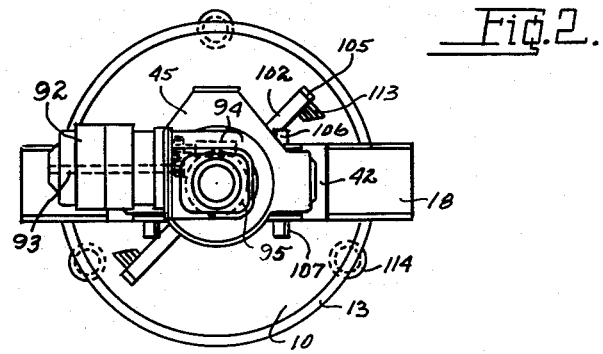
FIG. 2 is a top plan view of the device as illustrated in FIG. 1.
Figure 1:
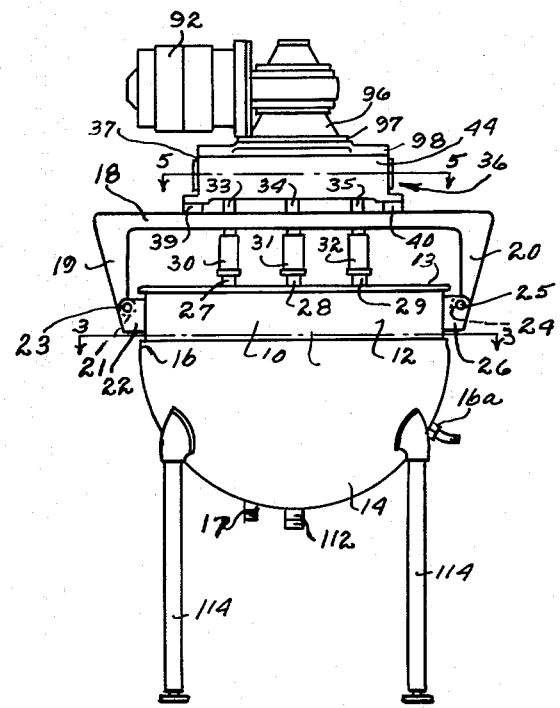
FIG. 1 is an elevational view of a mixer-cooker embodying the principals of the present invention.

As illustrated in the drawings the cooker-mixer of the present invention comprises, as is relatively customary, a kettle or container 10 which may be described as semi-spherical which includes the semi-spherical bottom 11 with relatively short upstanding, or vertical, sides 12 having the upper end open and for convenience and trim with its upper end outwardly flanged as at 13. Disposed exteriorly of the kettle or container 10 and particularly with respect to its semi-spherical bottom 11 there is provided a substantially semi-spherical outer member 14, commonly referred to as a jacket. The said outer member or jacket 14 is generally formed to a slightly greater radius than the kettle bottom 11 so that when mounted in position a space 15 is provided between the jacket and the kettle bottom. Any suitable or desirable means may be employed for securing the jacket 14 to the kettle such as providing the jacket with an inwardly positioned relatively straight portion or flange 16 through which it may be welded, brazed or otherwise secured to the kettle 10 and have a leak-proof joint.

The space 15 is employed to supply the heat exchange medium to the kettle which is generally steam and for which purpose the said jacket 14 is provided with a fitting 16a from which extends a pipe, conduit or the like, not shown, to a suitable source of steam, again, not shown in the drawings. Steam, as is well known, condenses as it gives up its heat and the product of condensation is removed from the jacket and for which purpose the jacket 14 has secured thereto a second coupling 17 to which may be attached a pipe, conduit, or the like, not shown in the drawings, that communicates with a sewer or sump.

Upwardly of the kettle 10 there is a transverse support or bridge 18 having at opposite ends thereof a depending arm 19 and 20 through which the bridge is attached to the kettle 10. Preferably the bridge has a pivoted connection with the kettle wherefore the arm 19 is illustrated as provided with an ear 21 at its free end which cooperates with an outwardly projecting bracket or lug 22 on the kettle to receive a pivot pin 23 and through which the bridge 18 is actuated from its operative position, that shown in the drawings, to a position outwardly of the kettle. To retain the bridge in its operative position above the kettle 10 the second arm 20 thereof is provided with a support portion 24 engaging a supporting pin 25 supplied by a second bracket or lug 26 outwardly projecting from the kettle 10 at a point diametrically of the bracket or lug 22.

As seen in FIG. 4 there is projecting into the kettle 10 three mixer shafts, respectively indicated by the reference numerals 27, 28 and 29 and which mixer shafts are respectively connected through couplings 30, 31 and 32 with driving shafts, respectively, indicated by reference numerals 33, 34 and 35 with said driving shafts each having connected or integral therewith one of said couplings 30, 31 and 32.

The driving shafts 33, 34 and 35 project from a drive unit indicated in its entirety by the reference numeral 36 with said shafts passing through the bridge 18 as clearly illustrated in FIG. 6.

The drive unit 36 comprises a relatively shallow housing 37 including a bottom 38 and from the lateral ends of which project a pair of supporting lugs, respectively, 39 and 40, with each pair of lugs resting on a transverse bar, respectively 41 and 42, forming a part of the bridge 18. Suitable securing screws 43 pass through the bars 41 and 42 into the lugs 39 and 40 for securing the drive unit to the bridge. The drive unit housing includes an upstanding wall 44, including convenience outlets provided with covers, and an open upper end. The housing open upper end is closed by a removable top 45.

The drive unit housing bottom 38 and top 45 are each provided with supports, respectively, for anti-friction bearings 46 and 47 for, respectively, each of the driving shafts 33 and 35 and with said bearings being located at opposite ends of reduced portions 48 and 49, respectively, of said shafts 33 and 35. Keyed, or otherwise secured, to the said reduced portion 48 and 49 of the shafts 33 and 35 is, respectively, a roller chain gear or sprocket 50 and 51 which are substantial duplicates of one another. Said gears or sprockets 50 and 51 are of the type to cooperate with multi-strand roller chains, as specifically illustrated in the drawing, "triple strand" roller chains.

The drive shaft 34 is likewise provided with a reduced portion 52 having at one end thereof an anti-friction bearing 53 carried by a suitable support on the housing bottom 38. The drive shaft reduced portion 52 upwardly of the bearing 53, has a roller chain sprocket or gear 54 keyed or otherwise secured thereto. The said roller chain sprocket or gear 54, similar to the sprockets 50 and 51, is of the type to cooperate with a multi-strand roller chain. The roller chain sprocket or gear 54 has upwardly projecting therefrom a hub 55 with which cooperates an anti-friction bearing 56 carried by a support supplied by the housing top 45 for, in effect, providing an anti-friction bearing at the upper end of the sprocket or gear 54.

The gear hub 55 is counter-bored at 57 to receive a driving bushing or sleeve 58 which is keyed or otherwise secured to the said gear hub 55. The bushing or sleeve 58 is centrally bored to receive a prime mover driving shaft 59 which, inturn, is keyed or otherwise secured to the said driving bushing or sleeve 58.

As will presently be made clear, the prime mover driving shaft 59 is associated with a prime mover which may take any suitable or acceptable form.

The drive unit housing 36 rearwardly of the driving sprocket pinions or gears 33, 34 and 35 is provided with an idler roller chain sprocket or gear 60 which, as shown in FIG. 7, is mounted on anti-friction bearings 61 and 62 spacedly secured to an idler shaft or stud 63, with said anti-friction bearings 61 and 62 being permanently spaced from one another by a spacer sleeve 64.

The idler shaft or stud 63 is secured through a reduced threaded end 65 and a nut 66 to an arm 67 which, for convenience in construction, is provided with an offset portion 68 disposed on a boss 69 upstanding from the drive unit housing base or bottom 38. The said offset portion or finger 68 of the arm 67 is provided with an aperture through which projects a pivot bolt 70 threadedly secured in the boss 69. The pivot bolt 70 is of the variety known as "a shouldered bolt" and has a bearing portion 71 between its head and thread 73 wherefore the arm 67 and its idler sprocket 60 may be oscillated or moved on the axial center of said bolt 70.

The arm 67 on the other side of the idler shaft or stud 63 is provided with an aperture 74 through which extends a stem 75 of a swivel nut 76. The stem 75 of the swivel nut is secured in the arm 67 by a cap screw in such a manner that the said swivel nut 76 may readily swivel or oscillate relative to the arm 67.

The swivel nut 76 is provided at right angles to its axis with a threaded aperture receiving an adjusting or tightening screw 78 which extends through an elongated aperture 79 in a lug 80 upwardly projecting from the drive unit housing base or bottom 38. Outwardly of the lug 80 the adjusting screw 78 is provided with an actuating head 81 between which and the lug 80 is a washer 82 to insure no misalignment of the said screw head 81 with respect to the lug elongated aperture 79.

Cooperating with the roller chain gears or sprockets 50, 51 and 54 and idler sprocket 60 is a roller chain 83 of the multi-strand variety specifically, as noted above, a triple-strand roller chain. The tension in said chain 83 is obtained through the screw 78 which, as seeen in FIG. 5, actuates the idler gear or sprocket 67 in a counter-clockwise direction on the pivot bolt 70. As will be noted, particularly in FIG. 5, the roller chain 83 passes around the upper side of the gears or sprockets 50 and 51 for actuating or rotating the same in the same direction while the said chain 83 passes around the lower side of the gear 54 for actuating or rotating it in the opposite direction. From this it follows that the driving shaft 34 is rotated in a direction opposite to the direction of rotation of driving shafts 33 and 35 for correspondingly rotating the mixer shafts 27, 28 and 29.

As was noted above, the driving shafts 33, 34 and 35 are connected with the mixer shafts 27, 28 and 29 through couplings 30, 31 and 32, and which couplings may take any desirable form keeping in mind that the said mixing shafts should be removable from the kettle for cleaning purpose. As shown in FIG. 6 the coupling 31 is in the form of a socket receiving the upper end of the shaft 28 and the said parts are secured to one another through a pair of removable pins 84 and 85 which are substantially identical with one another, and each pin comprising a cylindrical body portion 86 having a head 87 at one end and a retaining pin 88 with a pulling and locking ring 89 at its other end.

The mixer shafts 27 and 29 are, similar to the mixer shaft 28, inserted into the sockets of their respective couplings 30 and 32 and the parts are connected through a pair of securing pins. The said securing pins for the sockets 30 and 32 and the mixer shafts 27 and 29 take the form of a tapered pin 90 and a removable pin 91; said removable pin 91 being similar in all respects to the above described removable pins 84 and 85.

Before the removal of the mixer shafts 27, 28 and 29 from the kettle the mixer shaft 28 is disconnected from its driving shaft 34 by removing the pins 84 and 85 whereupon the bridge 18 may be actuated on its pivotal mounting for removing the mixing shafts 27 and 29 from the kettle. The reason for this is that the mixing shaft 28 with its mixer element are quite heavy and would place an unnecessary burden on the bridge if it were removed from the kettle by the bridge. Obviously, the mixer shaft 28 is separately removed from the kettle so that all parts thereof may be suitably cleaned and sterilized.

As was noted above the drive shaft 59 may be from any suitable or desirable prime mover or source of power. Preferably the source of power comprises an electric motor 92 from which extends a motor shaft 93 having operatively connected thereto a worm 94. The worm 94, in turn, meshes with a worm wheel 95 secured to the upper end of the drive shaft 59.

The drive shaft 59 is suitably journaled in bearings supplied by a housing 96 with said housing terminating in a flange 97.

Since the prime mover, including the motor and parts associated therewith to and including the driving shaft 59 are commercial products, the flange 97 of different manufacturers may not be to the same dimensions, or it may be desirable to utilize different horsepower motors, such as 92, due to the particular ingredients within the kettle, wherefore the said flange 97 of the prime mover is not secured directly to the drive unit but is preferably secured to an intermediate member or plate 98 formed to fit the top or cover 45 of the drive unit housing. In this instance the said intermediate member or plate 98 is secured to the said drive unit cover 45 by means of bolts 99 extending upwardly through the said drive unit cover 45.

The intermediate member or plate 98 has secured thereto the flange 97 of the prime mover and which securement is effected through bolts or screws 100. In view of the fact, as noted above, that different prime mover assemblies may be employed and which assemblies may have driving shafts 59 of different diameters the connection of the drive shaft of the prime mover with the mixer shaft is of particular advantage. In other words, to adopt a different diameter of the drive shaft 59 to the mixer of the present invention, it is only necessary to bore the bushing or sleeve 58 to fit the said shaft 59 since the said bushing or sleeve 58 was previously formed to fit the counter-bore 57 in the driving gear hub 55.

From the foregoing, it should be noted that the drive unit is substantially a non-oiling and greaseless unit since the ball bearings are of the sealed type and each provided with its own grease and oil seal to prevent loss therefrom of its lubrication. The sprocket gear chain is preferably made with rollers that need no lubrication, such as "nylon," which at the same time has a long life in use. Further, and as noted above, the provision of the drive coupling or bushing 58 at the upper end of the drive unit enables the placement or replacement of the parts easy and economically since it is outside of the kettle or mixer.

The above construction provides an ideal mechanism for use with food kettles as it is not necessary to lubricate or grease the moving or operating parts and therefore no contamination can follow the shafts into the kettle as is a fault with construction as heretofore employed.

The mixer shaft 28 at its lower end has secured thereto a hub 101 to the outer surface of which is secured a mixing member or blade 102. The mixing member or blade 102 as seen in FIGS. 3 and 4, is relatively narrow while being of considerable longitudinal length. The said mixing member or blade follows closely the interior contour of the kettle 10 and therefore has a substantial semi-circular body portion 103 with parallel upstanding end portions 104 and 105. The mixing member or blade 102 throughout its length is spaced from the interior of the kettle 10 with said space being judiciously determined and whereby said mixing member or blade effects the mixing of the ingredients lying inwardly of the said kettle inner surface.

As noted above the mixing shafts 27 and 29 are respectively laterally on each side of the mixing shaft 28 and extend into the kettle between the mixing member or blade arms 104 and 105 to a point to be upwardly of the body portion 103 of said mixing member. The said mixing shafts 27 and 29 are each provided with a plurality of mixing members or paddles 106 and 107 respectively projecting from each side of each of said shafts but stopping short of the mixing member body portion 103 and upstanding end portions 104 and 105 when laterally thereof and with the said mixing members or paddles 106 and 107 likewise stopping short of the central mixing shaft 28 when in line with one another laterally of the kettle, all as clearly illustrated in FIG. 4. The said mixing members or paddles 106 and 107 are spaced from one another to provide a space 108 and 109 between each two adjacent mixing members or paddles 106 and 107 vertically of the mixing shafts 27 and 29. The central mixing shaft 28 in addition to carrying the mixing member or blade 102 at its lower or inner end is provided longitudinally thereof with mixing members or paddles 110 and 111 respectively from each side thereof which are located on said shaft 28 as to pass through the spaces 108 and 109 between the mixing members or paddles 106 and 107.

It should be noted that the mixing members or paddles 110 and 111 on the central mixer shaft 28 may be omitted and dependence placed for mixing only on the mixing member or blade 102 and the cooperation of the mixing members or paddles 106 and 107 therewith. However for a more thorough mixing of the kettle ingredients the mixing members or paddles 110 and 111 may be applied to the shaft 28 for cooperation with the said mixing members or paddles 106 and 107 of mixer shafts 27 and 29. The paths of movement of the mixing members or paddles and mixing member or blade are shown by broken line circles in FIG. 3 and the direction of movement of the parts is indicated by appropriate arrows adjacent said movement circles.

While the mixer shafts 27 and 29 are each shown as provided with paddles or arms it is obvious that other mixing members may be substituted, and particularly when the central mixing shaft is not provided with mixing means, such as the paddles or arms 110 and 111.

Extending from the interior of the kettle 10 at the bottom thereof is a discharge pipe 112 which is in turn connected with a suitable valve controlled pipe or conduit to convey the ingredients from the mixer kettle upon completion of the mixing operation.

As is usual practice the mixer element or blade 102 may have secured to its outer surface in spaced relation to one another suitable scrapers 113 to prevent sticking of the ingredients within the kettle to the inner surface thereof.

The kettle and all parts thereof may be suitably supported with respect to the floor as by legs 114 secured to the exterior of the jacket 14 to depend therefrom.

From the foregoing, it will now be appreciated that the present cooker-mixer including the central mixing member or blade 102 and the cooperating mixing members or paddles 105 and 107 on each of the mixing shafts 27 and 29 more efficiently mix the ingredients than was possible with prior structures which only included the mixer member or blade 102. From this it will follow that the mixing time can be materially reduced and that the cooking or processing temperature can be raised within the jacket area 15 since the ingredients will be subjected to the cooking heat a much shorter length of time.

It will further be appreciated that by supplying the mixer shaft 27 with the mixing members or paddles 110 and 111 for cooperation with the mixing members or paddles 106 and 107 on the mixer shafts 27 and 29 a still greater mixing of the ingredients is effected as the said ingredients will be mixed in a plurality of zones transversely of the kettle instead of in one or two zones as was the practice of the past.

What is claimed is:

1. In a cooker-mixer the combination with a jacketed kettle having a substantially semi-spherical bottom in vertical cross-section and having an open upper end, and a supporting bridge fixedly secured to the kettle across the open upper end thereof supporting a prime mover including a driving shaft, of a motion transmitter on said bridge connected with the prime mover driving shaft, a plurality of interconnected driven shafts projecting from said motion transmitter through the bridge toward and into the interior of the kettle, a plurality of mixer units within the kettle, each including a shaft respectively connected with a driven shaft from the motion transmitter, said mixer units shafts and interconnected motion transmitting driven shafts being spaced from one another and the interior surface of the kettle, said mixer units and their shafts being located with respect to one another to have one mixer unit and its shaft substantially centrally of the kettle and a mixer unit and its shaft laterally of each side of said central mixer unit and its shaft, a substantially semi-circular mixing blade on the lower end of said central mixer unit shaft cooperating with the kettle substantially semi-spherical bottom inner surface in effecting a mixing operation, mixing paddles on each lateral mixer unit shafts cooperating with the mixing blade in effecting additional mixing inwardly of the kettle wall, and said motion transmitter including means so that adjacent mixer units and their shafts are reversely actuated.

2. In a cooker-mixer the combination with a jacketed kettle having a substantially semi-spherical bottom in vertical cross-section and having an open upper end, and a supporting bridge fixedly secured to the kettle across the open upper end thereof supporting a prime mover including a driving shaft, a motion transmitter on said bridge connected with the prime mover driving shaft, a plurality of interconnected driven shafts projecting from said motion transmitter through the bridge toward and into the interior of the kettle, a plurality of mixer units within the kettle, each including a shaft respectively connected with a driven shaft from the motion transmitter, said mixer units shafts and interconnected motion transmitting driven shafts being spaced from one another and the interior surface of the kettle, said mixing units and their shafts being located with respect to one another to have one mixer unit and its shaft substantially centrally of the kettle and a mixer unit and its shaft laterally of each side of said central mixer unit and its shaft, a substantially semi-circular mixing blade on the lower end of said central mixer unit shaft cooperating with the kettle substantially semi-spherical bottom inner surface in effecting a mixing operation, mixing paddles on each lateral mixer unit shaft cooperating with the mixing blade in effecting additional mixing inwardly of the kettle wall, mixing paddles on said central mixer unit shaft upwardly of its mixing blade cooperating with said lateral mixer units shafts paddles in effecting further mixing operations, and said motion transmitter including means so that adjacent mixer units and their shafts are reversely actuated.

3. In a cooker-mixer the combination with a jacketed kettle having a substantially semi-spherical bottom in vertical cross-section and having an open upper end, and a supporting bridge fixedly secured to the kettle across the open upper end thereof supporting a prime mover including a driving shaft, a motion transmitter on said bridge connected with the prime mover driving shaft, a plurality of interconnected driven shafts projecting from said motion transmitter through the bridge toward and into the interior of the kettle, a plurality of mixer units within the kettle, each including a shaft respectively connected with a driven shaft from the motion transmitter, said mixer units shafts and interconnected motion transmitting driven shafts being spaced from one another and the interior surface of the kettle, mixing members on each of said mixer units shafts cooperating with one another in the space between adjacent mixer shafts and the interior surface of the kettle for mixing the ingredients within the kettle, said mixing units and their shafts being located with respect to one another to have one mixer unit and its shaft substantially centrally of the kettle with a mixer unit and its shaft laterally of each side of said central mixer unit and its shaft, and said motion transmitter including means so that adjacent mixer units and their shafts are reversely actuated, including a roller chain sprocket on each driven shaft, and a roller chain passing on opposite sides of adjacent sprockets.

4. In a cooker-mixer the combination with a jacketed kettle having a substantially semi-spherical bottom in vertical cross-section and having an open upper end, and a supporting bridge fixedly secured to the kettle across the open upper end thereof supporting a prime mover including a driving shaft, of a motion transmitter on said bridge connected with the prime mover driving shaft, a plurality of interconnected driven shafts projecting from said motion transmitter through the bridge toward and into the interior of the kettle, a plurality of mixer units within the kettle, each including a shaft respectively connected with a driven shaft from the motion transmitter, said mixer units shafts and interconnected motion transmitting driven shafts being spaced from one another and the interior surface of the kettle, mixing members on each of said mixer units shafts cooperating with one another in the space between adjacent mixer shafts and the interior surface of the kettle for mixing the ingredients within the kettle, said mixing units and their shafts being located with respect to one another to have one mixer unit and its shaft substantially centrally of the kettle with a mixer unit and its shaft laterally of each side of said central mixer unit and its shaft, and said motion transmitter including means so that adjacent mixer units and their shafts are reversely actuated, including a roller chain sprocket on each driven shaft, a roller chain passing on opposite sides of adjacent sprockets, and a roller chain tensioning device associated with the motion transmitter.

5. In a cooker-mixer the combination with a kettle having an open upper end, and a supporting bridge across the open upper end of the kettle, of a motion transmitter on said bridge having a housing with a plurality of driven shafts projecting therefrom, interconnected driving members within said housing on said driven shafts for simultaneously actuating said shafts, one of said driving members having a socket substantially axially, centrally thereof, a centrally bored driving sleeve keyed within said driving member socket and having its central bore accessable through the motion transmitter housing, and a prime mover supported by said motion transmitter housing and having a drive shaft projecting therefrom into the central bore of the driving sleeve and keyed thereto for actuating the driving members and their driven shafts.

6. In a cooker-mixer the combination with a kettle having an open upper end, and a supporting bridge fixedly to the upper end of the kettle across the open upper end thereoef, of a motion transmitter on said bridge having a housing with a plurality of driven shafts projecting therefrom through the bridge and the open upper end of the kettle into the interior of the kettle, each of said driven shafts within the motion transmitter housing having connected therewith a roller chain sprocket, an endless roller chain engaging and connecting said sprockets to one another to effect their simultaneous rotation, and a prime mover supported by said motion transmitter housing having a drive shaft connected with one of said roller chain sprockets for actuating the same and through the roller chain simultaneously actuating all of the driven shafts sprockets.

7. In a cooker-mixer the combination with a kettle having an open upper end, and a supporting bridge across the open upper end of the kettle, of a motion transmitter on said bridge having a housing with a plurality of driven shafts projecting therefrom, each of said driven shafts within the motion transmitter housing having connected therewith a roller chain sprocket, an endless roller chain engaging and connecting said sprockets to one another to effect their simultaneous rotation, one of said roller chain sprockets having a socket substantially axially, centrally thereof, a centrally bored driving sleeve keyed within said roller chain sprocket socket and having said bore accessable through the motion transmitter housing, and a prime mover supported by said motion transmitter housing having a drive shaft projecting therefrom into the central bore of the driving sleeve and keyed thereto for actuating the roller chain sprockets and their driven shafts.

References Cited by the Examiner

UNITED STATES PATENTS

| | | | |
|---|---|---|---|
| 338,583 | 3/1886 | Burkhard | 259—64 X |
| 499,890 | 6/1893 | Savage | 259—41 |
| 1,390,251 | 9/1921 | Schoppner | 259—104 X |
| 1,499,890 | 7/1924 | Stevens | 259—104 |
| 1,588,901 | 6/1926 | Merrell | 259—104 X |
| 1,733,516 | 10/1929 | Rodin et al. | 259—104 |
| 2,501,805 | 3/1950 | Yingling | 259—21 X |
| 2,623,449 | 12/1952 | Losee | 259—108 X |

CHARLES A. WILLMUTH, *Primary Examiner.*